(12) United States Patent
Harada et al.

(10) Patent No.: US 10,489,652 B2
(45) Date of Patent: Nov. 26, 2019

(54) IMAGE CAPTURING SYSTEM

(71) Applicant: Olympus Corporation, Hachioji-shi, Tokyo (JP)

(72) Inventors: Hisayuki Harada, Tokyo (JP); Yuichi Tsuchimochi, Tokyo (JP)

(73) Assignee: Olympus Corporation, Tokyo (JP)

( * ) Notice: Subject to any disclaimer, the term of this patent is extended or adjusted under 35 U.S.C. 154(b) by 31 days.

(21) Appl. No.: 15/963,070

(22) Filed: Apr. 25, 2018

(65) Prior Publication Data

US 2018/0373935 A1 Dec. 27, 2018

(30) Foreign Application Priority Data

Jun. 27, 2017 (JP) .................................. 2017-125216

(51) Int. Cl.
*H04N 5/232* (2006.01)
*H04N 5/262* (2006.01)
(Continued)

(52) U.S. Cl.
CPC ....... *G06K 9/00671* (2013.01); *G06K 9/2081* (2013.01); *G06T 11/60* (2013.01);
(Continued)

(58) Field of Classification Search
CPC .... G06K 9/00671; G06K 9/2081; G06K 9/20; G06T 11/60; H04N 5/23229;
(Continued)

(56) References Cited

U.S. PATENT DOCUMENTS

2004/0249861 A1* 12/2004 Hoshino ............ H04N 5/23293
348/333.02
2014/0019148 A1* 1/2014 Buzz ..................... G06Q 10/00
705/1

(Continued)

FOREIGN PATENT DOCUMENTS

JP 2016-189199 11/2016

OTHER PUBLICATIONS

M. Golparvar-Fard et al., "D4—A 4-dimensional augmented reality model for automatic construction progress monitoring data collection, processing and communication"—ITcom, vol. 14 (2009); p. 129-154) (Year: 2009).*

*Primary Examiner* — Marly S Camargo
(74) *Attorney, Agent, or Firm* — John C. Pokotylo; Pokotylo Patent Services

(57) ABSTRACT

An image capturing system includes: an information processing apparatus that includes a display-board-image generator 212 that generates a display-board image, a construction-related-information generator 214 that generates construction-related information, and a communicator 230 that transmits the display-board image and the construction-related information to an imaging apparatus; and the imaging apparatus that includes a communicator 130 that receives the display-board image and the construction-related information that are transmitted from the information processing apparatus, and an image synthesizer 112 that synthesizes the display-board image into a captured image so as to generate a captured image with a display board.

12 Claims, 17 Drawing Sheets

(51) Int. Cl.
  *G06K 9/00* (2006.01)
  *G06K 9/20* (2006.01)
  *G06T 11/60* (2006.01)

(52) U.S. Cl.
  CPC ..... *H04N 5/23229* (2013.01); *H04N 5/23245* (2013.01); *H04N 5/23293* (2013.01); *H04N 5/2621* (2013.01)

(58) Field of Classification Search
  CPC ............ H04N 5/23245; H04N 5/2322; H04N 5/23293; H04N 5/2621; G06F 17/30265; G06F 17/3028
  USPC ....... 348/231.5, 231.6, 231.3, 222.1, 211.14, 348/552; 345/633, 629, 630; 382/284, 382/309
  See application file for complete search history.

(56) References Cited

U.S. PATENT DOCUMENTS

| | | | |
|---|---|---|---|
| 2016/0094785 A1* | 3/2016 | Muro ................. | H04N 5/23229 348/231.3 |
| 2018/0012125 A1* | 1/2018 | Ladha ...................... | G06N 3/08 706/20 |
| 2019/0180105 A1* | 6/2019 | Sasson ............... | G06K 9/00671 382/100 |

* cited by examiner

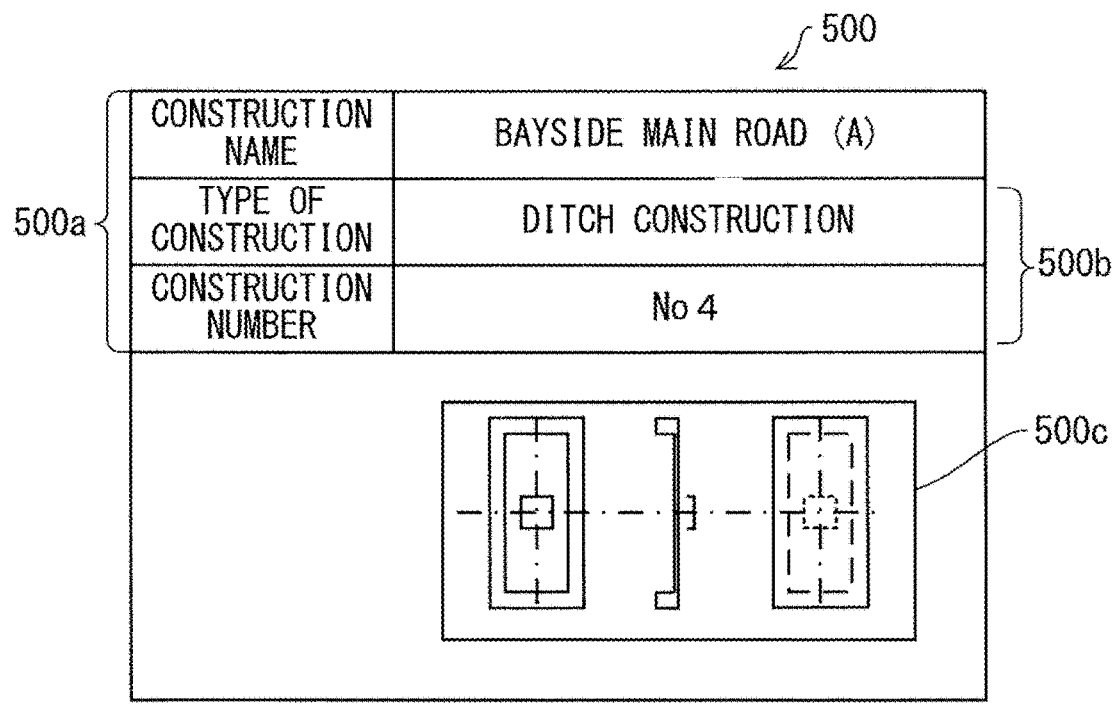
F I G. 2 A

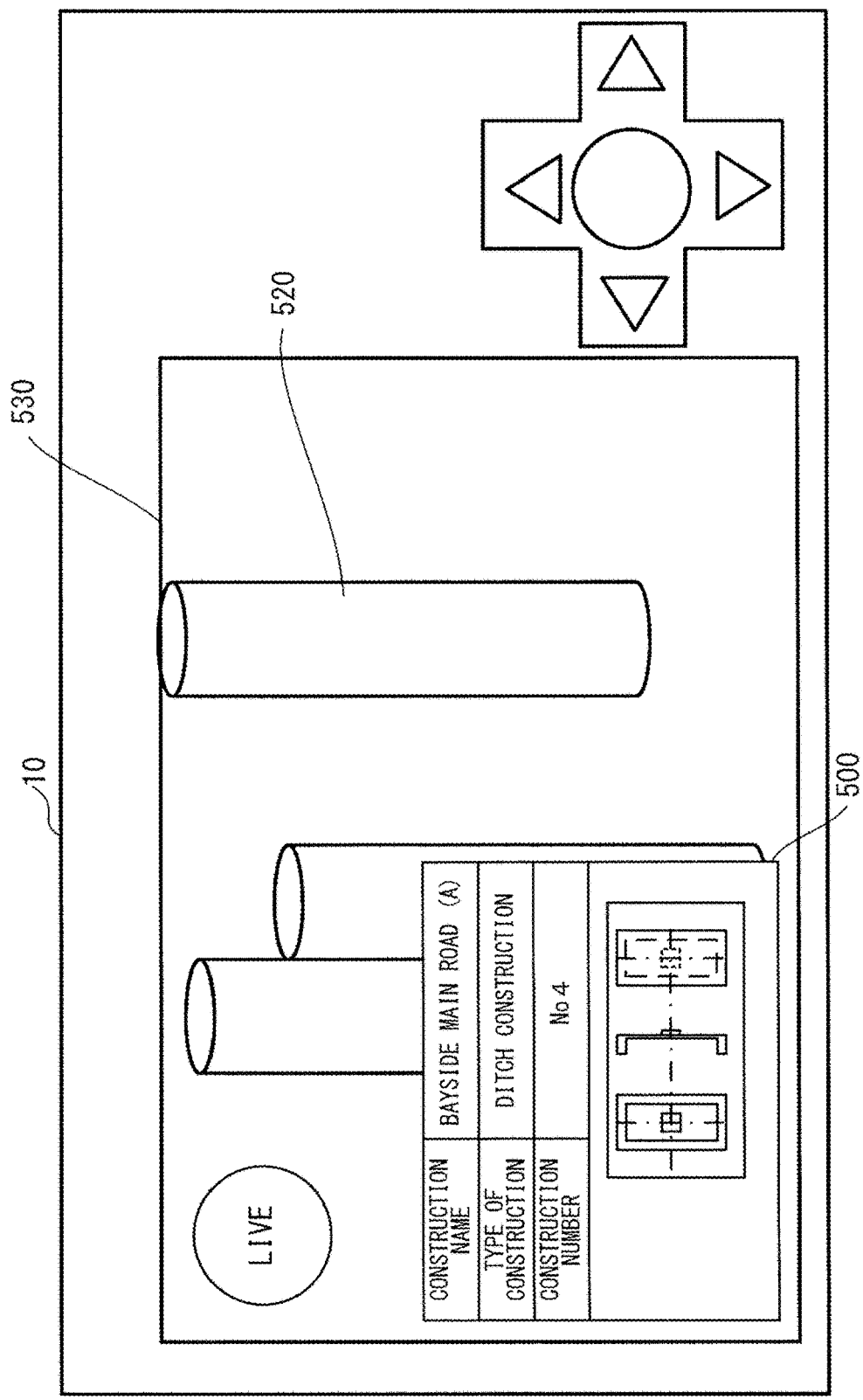

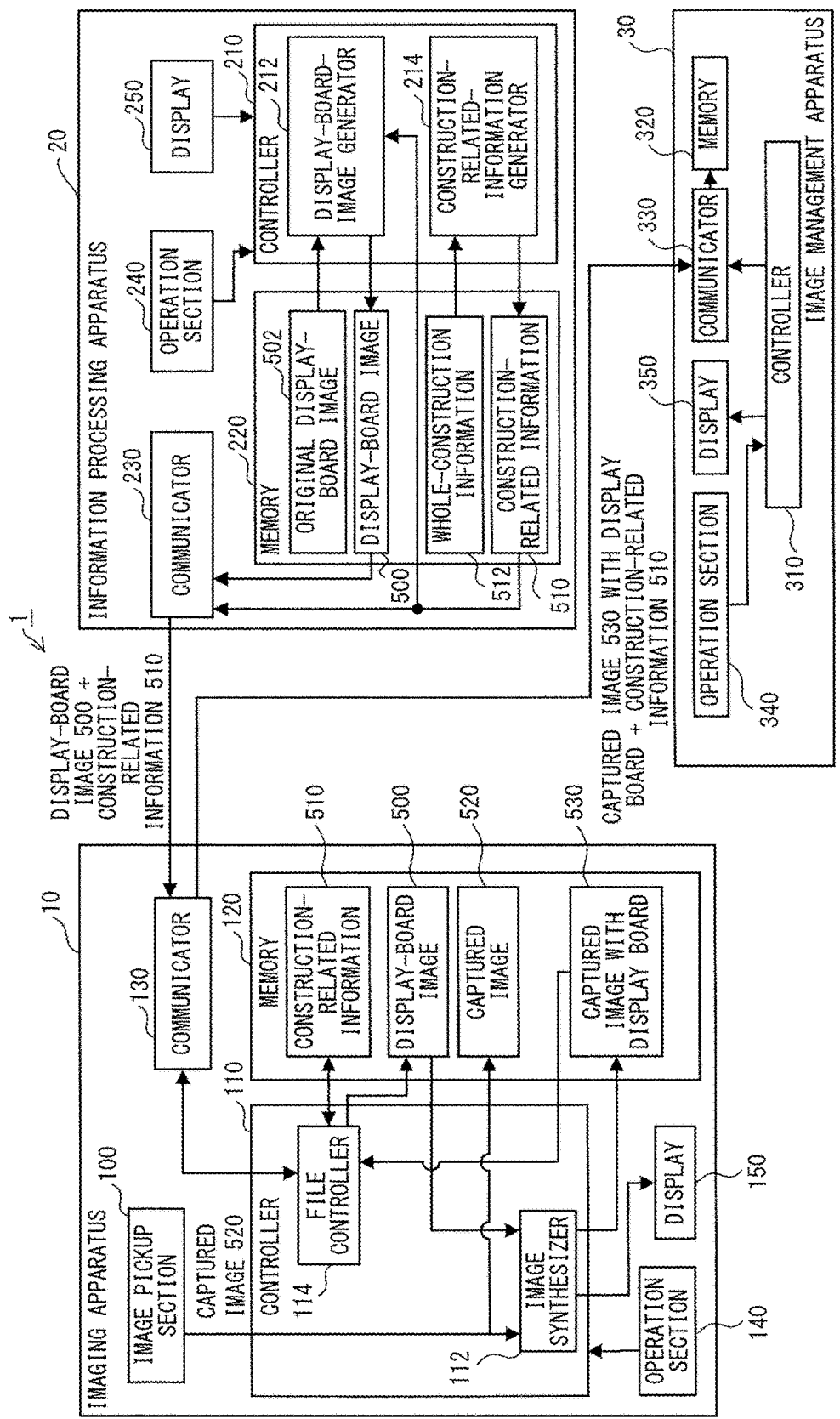
F I G. 3

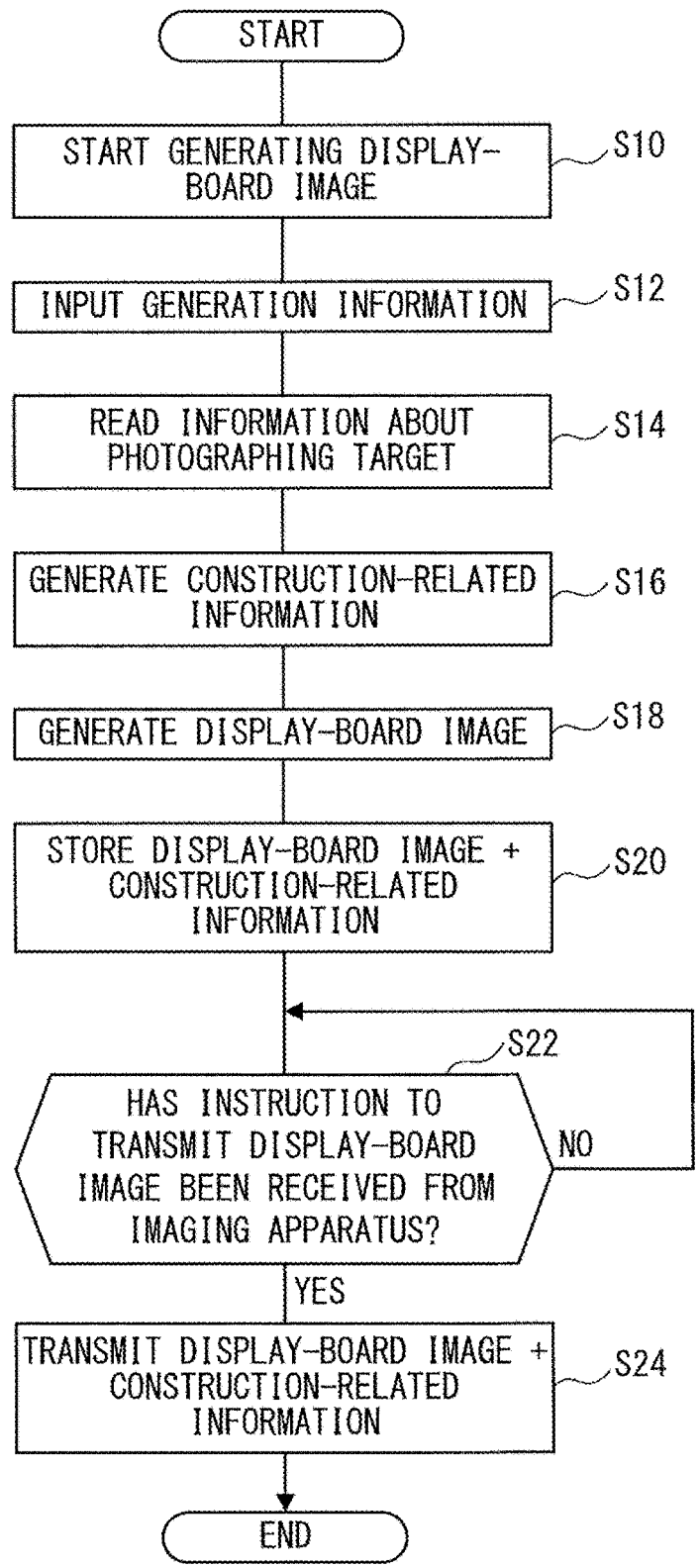
F I G. 7

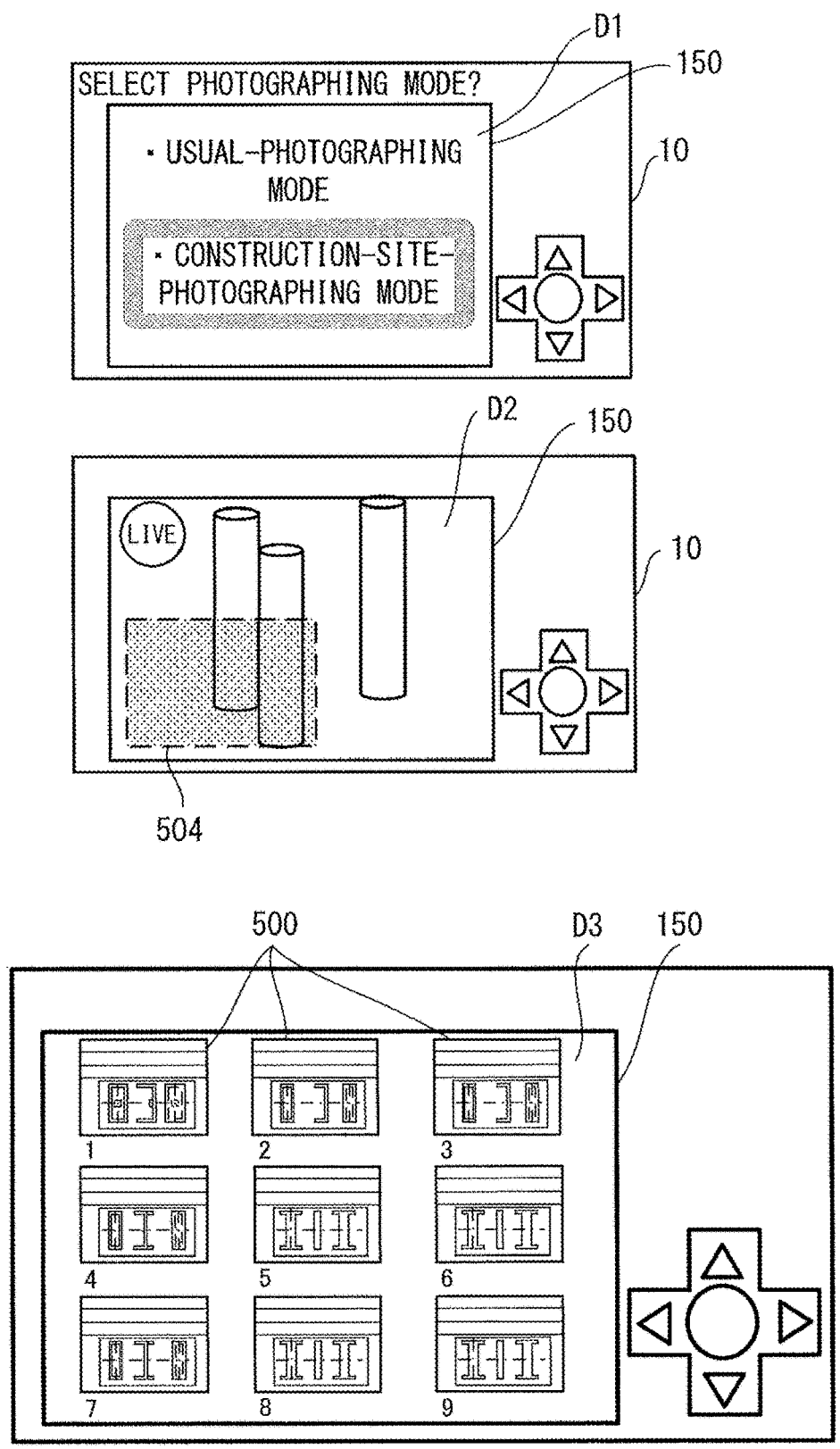
F I G. 1 2

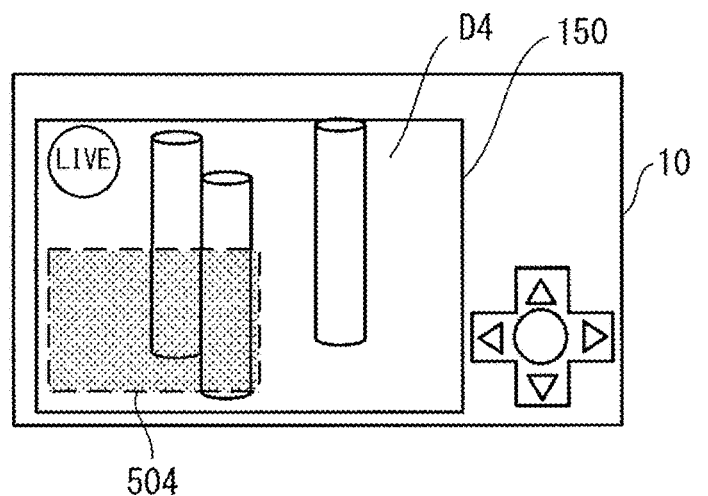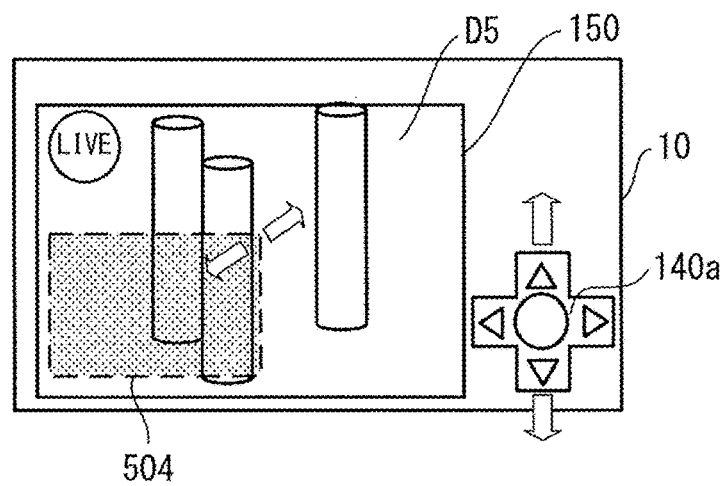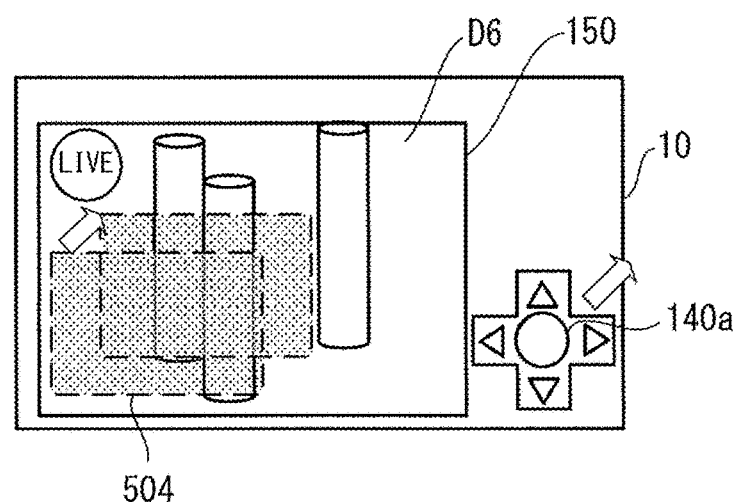
FIG. 13

IMAGE CAPTURING SYSTEM

CROSS-REFERENCE TO RELATED APPLICATIONS

This application is based upon and claims the benefit of priority of the prior Japanese Patent Application No. 2017-125216, filed on Jun. 27, 2017, the entire contents of which are incorporated herein by reference.

BACKGROUND OF THE INVENTION

Field of the Invention

The present invention relates to a construction-site photographing technology that writes, on a display board, information about a construction site to be photographed, and uses the display board as an evidence of the construction site.

Description of the Related Art

Construction-state photographing at a construction site has often been used to prove that the construction is being performed properly since it became possible to capture and manage thousands of images using, for example, a camera. The protection and management of an evidence using a captured image is one of the important processes in a construction management such as a time schedule management, an as-built drawing management, and a quality management. Conventionally, in order to manage a construction, a display board on which a construction state is written is arranged at a construction site when photographing is performed. It is possible to know the details of a captured photo from the display board.

However, there is a need to rewrite information on a display board according to a photographing location if the display board is provided at a construction site when photographing is performed. This is a troublesome task for a worker. Further, it is necessary for a display board (a blackboard) to be held by a worker who is different from a worker who performs photographing, so that information written on the display board can be read correctly. As described above, there is a need for many workers when photographing is performed using a display board. Further, there may be a need to change a position of a display board and to perform photographing several times when photographing is performed using a display board, because there is a possibility that letters written on the display board will not be readable due to, for example, a bad exposure condition at a construction site. As described above, photographing using a display board imposes a great burden on a worker.

With respect to a construction-site image with a display board, capturing of a construction-site image by use of a so-called electronic display board in which a display board is replaced with an image has been proposed in recent years. When an image of a construction site is captured using an electronic display board, there will be no need for all of the tasks described above, such as rewriting information on a display board, providing a worker who holds a display board, or confirming whether letters written on a display board is readable, if an image of an electronic display board is created in advance. This results in greatly reducing a burden imposed when a construction-site image is captured. The technology disclosed in Patent Document 1 is an example of a technology that adds an electronic display board to a construction-site image.

Patent Document 1 has proposed a device including an imaging apparatus in which a technology is used that adds construction-site-related data included in a virtual display board image to a maker-specific area of EXIF data in order to create an image with an electronic blackboard that is obtained by synthesizing the virtual display board image into an image of a construction site, the virtual display board image is an image to which the construction-site-related data has been input.

Patent Document 1: Laid-open Patent Publication No. 2016-189199

SUMMARY OF THE INVENTION

An image capturing system according to the present embodiment includes an imaging apparatus and an information processing apparatus, wherein the information processing apparatus includes a display-board-image generator that generates a display-board image corresponding to a photographing target, a construction-related-information generator that generates construction-related information about the photographing target, and a communicator that transmits the display-board image and the construction-related information to the imaging apparatus; the imaging apparatus includes an image pickup section that captures an image and outputs the captured image, a communicator that receives the display-board image and the construction-related information that are transmitted from the information processing apparatus, and an image synthesizer that synthesizes the display-board image corresponding to the photographing target into the captured image so as to generate a captured image with a display board; and the communicator of the imaging apparatus transmits the generated captured image with a display board and the construction-related information to the outside.

BRIEF DESCRIPTION OF THE DRAWINGS

FIGS. 2A and 2B illustrate an example of displaying a display-board image and a captured image with a display board;

FIG. 3 is a functional block diagram of the image capturing system;

FIG. 7 is a flowchart that illustrates a procedure of display-board-image transmitting processing performed by the information processing apparatus;

FIG. 12 illustrates screens D1 to D3 displayed on the imaging apparatus;

FIG. 13 illustrates screens for explaining a manipulation of processing of changing a position of a display-board image;

DETAILED DESCRIPTION OF THE PREFERRED EMBODIMENTS

Figure 1:
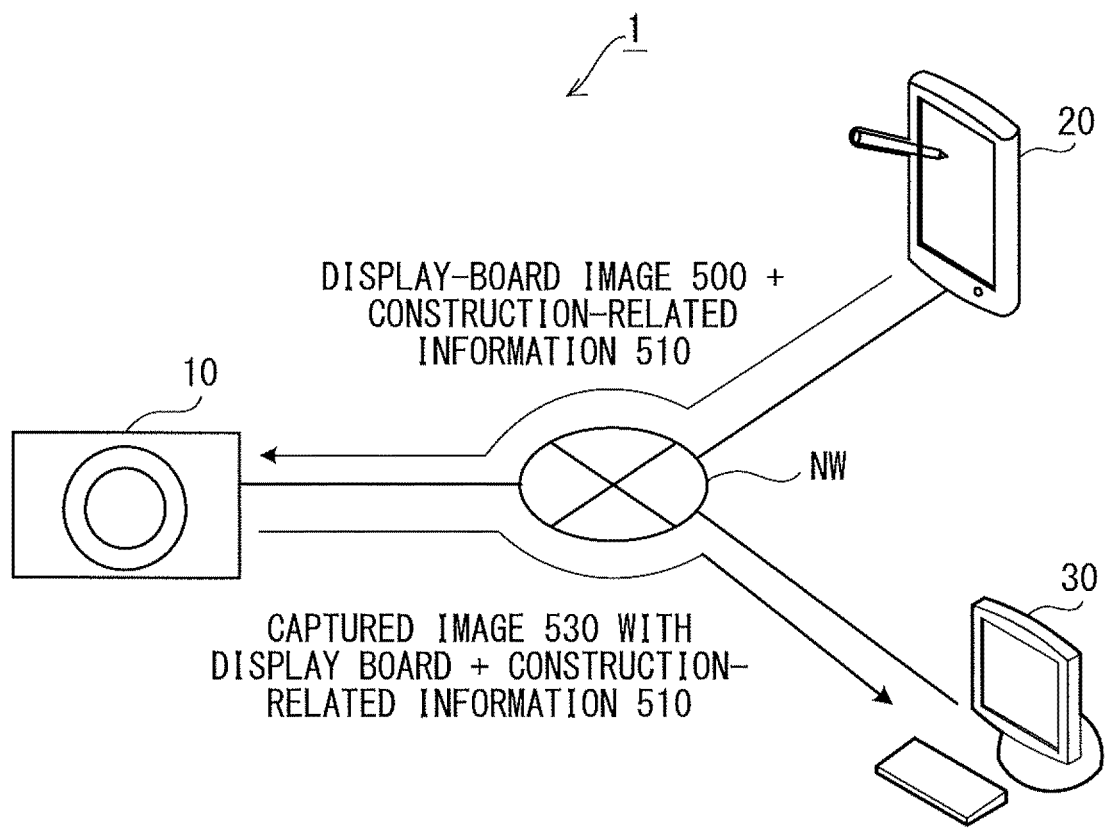
FIG. 1 illustrates an image capturing system according to an embodiment of the present invention.

Embodiments of the present invention are described below with reference to the drawings. FIG. 1 illustrates an overall configuration of an image capturing system 1 according to an embodiment of the present invention. The image capturing system 1 includes an imaging apparatus 10, an information processing apparatus 20, and an image management apparatus 30.

The imaging apparatus 10, the information processing apparatus 20, and the image management apparatus 30 are connected to a network NW and can communicate with one another. The image capturing system 1 is a system that manages a construction-related image captured at a construction site, and, in particular, a system that captures a construction-related image and manages the captured construction-related image. The image of a concrete construction state is also referred to as a construction-related image or a construction-related photo. Further, the image captured as an evidence of a construction is also referred to as an evidence image. The outline of the image capturing system 1 is briefly described below.

The imaging apparatus 10 is a digital camera that photographs a concrete construction state at a construction site.

As described above, when photographing is performed at a construction site, a display board indicating an outline of a concrete construction state is included in a portion of a construction-related image. The purpose of including a display board in a construction-related image is to make it possible to know a concrete construction state or a construction location at a glance after photographing is performed. Conventionally, information such as a construction name, a type of construction, and a photographing date and time are written by hand on a display board (also referred to as a small blackboard) at a construction site, and photographing is performed while including, in an image, the display board on which necessary information is written. The image capturing system 1 according to the present embodiment uses an electronic display board created by the information processing apparatus 20, instead of a display board on which information is written by hand.

The information processing apparatus 20 is, for example, a tablet-type information processing terminal. According to an instruction given by an operator, the information processing apparatus 20 generates a "display-board image 500" that corresponds to each photographing target (each construction target), and "construction-related information about each photographing target". The "construction-related information about a photographing target" is hereinafter referred to as construction-related information 510 or separate construction information. Examples of the "construction-related information about a photographing target" are a design drawing of a target construction portion, construction specifications, a name of a material used for a construction, and operation processing.

The information processing apparatus 20 transmits, to the imaging apparatus 10, a generated display-board image 500 that corresponds to each photographing target, and construction-related information 510 about each of the photographing targets. This will be described in detail with reference to FIG. 2A and subsequent figures.

The imaging apparatus 10 receives, from the information processing apparatus 20, a display-board image 500 that corresponds to each photographing target, and construction-related information 510 about each of the photographing targets. Then, the imaging apparatus 10 synthesizes the received display-board image 500 into a corresponding captured image, so as to generate a captured image 530 with a display board. The imaging apparatus 10 stores therein the generated captured image 530 with a display board and corresponding construction-related information 510. This makes it possible to omit writing a concrete construction state on a display board at a construction site.

The imaging apparatus 10 transmits, to the image management apparatus 30, the captured image 530 with a display board and the corresponding construction-related information 510. The image management apparatus 30 manages, as a captured construction-related image, the captured image 530 with a display board and the corresponding construction-related information 510. The image management apparatus 30 can manage the captured image 530 with a display board together with the construction-related information 510, the captured image 530 with a display board being a construction-related image, the construction-related information 510 being information about each construction portion.

FIGS. 2A and 2B illustrate an example of displaying a display-board image 500 and a captured image 530 with a display board. The display-board image 500 includes, for example, a display item 500a, display details 500b of the display item 500a, and a design drawing 500c of a construction target. Examples of the display item 500a are a construction name, a type of construction, and a construction number. The construction name is a name for a whole construction. The whole construction includes a plurality of construction portions. The construction number specifies a construction portion in a whole construction. With respect to the display details 500b, for example, a concrete construction name is given by the information processing apparatus 20 according to a construction target.

An example of the captured image 530 with a display board is depicted in FIG. 2B. The captured image 530 with a display board is displayed on a display provided on the back of the imaging apparatus 10. The display-board image 500 is synthesized into a captured image 520, for example, in the lower left part of the captured image 520, so as to generate the captured image 530 with a display board.

FIG. 3 is a functional block diagram of the image capturing system 1. The information processing apparatus 20 includes a controller 210, a memory 220, a communicator 230, an operation section 240, and a display 250.

The controller 210 performs an overall control of the entire information processing apparatus 20. The controller 210 includes a display-board-image generator 212 and a construction-related-information generator 214. According to construction-related information 510 about a photographing target, the display-board-image generator 212 adds, for example, display details 500b and a design drawing 500c to an original display-board image 502 stored in the memory 220, so as to generate a display-board image 500.

The original display-board image 502 is an image to which information specifying a concrete photographing target, that is, for example, the display details 500b and the design drawing 500c described with reference to FIGS. 2A and 2B, has not been added. The original display-board image 502 is a template image of a display board.

The construction-related-information generator 214 extracts necessary information from whole-construction information 512 stored in the memory 220, so as to generate construction-related information 510 about a photographing target. The whole-construction information 512 is information about a whole construction. In other words, the whole-construction information 512 includes, for example, design-drawing information for a whole construction, a time schedule, and a photographing plan. The photographing plan includes, for example, a construction portion to be photographed and a photographing condition that have been determined in advance. The information about a construction portion also includes information specifying a photographing target (such as display details 500b). Specifically, when an operator has selected a photographing target from, for example, a photographing plan displayed on a screen, the construction-related-information generator 214 reads, from whole-construction information 512, design-drawing information and a time schedule that correspond to the selected photographing target, so as to generate construction-related information 510 about the selected photographing target.

Next, the display-board-image generator 212 extracts display details 500b from the construction-related information 510 generated by the construction-related-information generator 214. Then, the display-board-image generator 212 adds the extracted display details 500b to the original display-board image 502, so as to generate a display-board image 500. Further, the display-board-image generator 212 may read the design-drawing information from the construction-related information 510 so as to add a design drawing 500c to the original display-board image 502.

An original display-board image 502, whole-construction information 512, a generated display-board image 500, and a generated construction-related information 510 are stored in the memory 220. The original display-board image 502 and the whole-construction information 512 may be stored in a database (not illustrated) that is connected to the information processing apparatus 20.

The communicator 230 is an interface that performs various information communications with an external device via, for example, a local area network (LAN). The communicator 230 transmits data to and receives data from an external device such as the imaging apparatus 10 or the image management apparatus 30.

An instruction given by an operator is input to the operation section 240, for example, through a keyboard or a touch panel. The display 250 is, for example, an LCD, and displays a menu screen and various data. The operator selects a construction target to be photographed (hereinafter also referred to as a photographing target) from a photographing plan displayed on the display 250, using the operation section 240. When the construction target to be photographed has been selected, the construction-related-information generator 214 generates construction-related information 510 about the selected construction target. Then, the display-board-image generator 212 generates a corresponding display-board image 500 according to the construction-related information 510, and the generated display-board image 500 is displayed on the display 250.

The generated display-board image 500 and the generated construction-related information 510 are stored in the memory 220. For example, the controller 210 incorporates the construction-related information 510 into a file of the display-board image 500 and stores the file in the memory 220. Then, the communicator 230 transmits, to the imaging apparatus 10, the file of the display-board image 500 into which the construction-related information 510 has been incorporated. The configurations of the display-board image 500 and the construction-related information 510 will be described later with reference to FIG. 14.

The imaging apparatus 10 includes an image pickup section 100, a controller 110, a memory 120, a communicator 130, an operation section 140, and a display 150.

The image pickup section 100 includes a lens, an imaging element, a signal processing section, and an image processing section that are not illustrated. The image pickup section 100 photographs a construction portion to be photographed, and outputs a captured image 520.

The controller 110 performs an overall control of the entire imaging apparatus 10. The controller 110 includes an image synthesizer 112 and a file controller 114. The image synthesizer 112 synthesizes a corresponding display-board image 500 into the captured image 520 so as to generate a captured image 530 with a display board.

The file controller 114 stores, in the memory 120, a display-board image 500 and construction-related information 510 that are transmitted from the information processing apparatus 20. In other words, the file controller 114 takes the construction-related information 510 from the display-board image 500, and stores the display-board image 500 and the construction-related information 510 separately in the memory 120. Further, when the file controller 114 transmits a captured image 530 with a display board to the image management apparatus 30, for example, the file controller 114 incorporates corresponding construction-related information 510 into a file of the captured image 530 with a display board and transmits the file. The configurations of the captured image 530 with a display board and the construction-related information 510 will be described later with reference to FIG. 15.

Construction-related information 510 and a display-board image 500 that are transmitted from the information processing apparatus 20, and a captured image 520 of a construction portion that is captured by the image pickup section 100 are stored in the memory 120. Further, a captured image 530 with a display board that is generated by the image synthesizer 112 is stored in the memory 120.

The communicator 130 is an interface that performs various information communications with the information processing apparatus 20 and the image management apparatus 30 via, for example, a local area network (LAN). The communicator 130 receives a display-board image 500 and construction-related information 510 that are transmitted from the information processing apparatus 20. Further, the communicator 130 transmits a captured image 530 with a display board and the construction-related information 510 to the image management apparatus 30.

Various instructions given by a photographer are input to the operation section 140. The display 150 is, for example, an LCD, and displays, for example, a live view image and a manipulation guide.

The image management apparatus 30 includes a controller 310, a memory 320, a communicator 330, an operation section 340, and a display 350. The controller 310 performs an overall control of the image management apparatus 30. A captured image 530 with a display board that is transmitted from the imaging apparatus 10, and corresponding construction-related information 510 are stored in the memory 320. The communicator 330 is an interface that performs various information communications with the imaging apparatus 10 via, for example, a local area network (LAN). Various instructions given to the image management apparatus 30 are input to the operation section 340. The display 350 is, for example, an LCD, and displays, for example, a captured image and various information.

Figure 4:
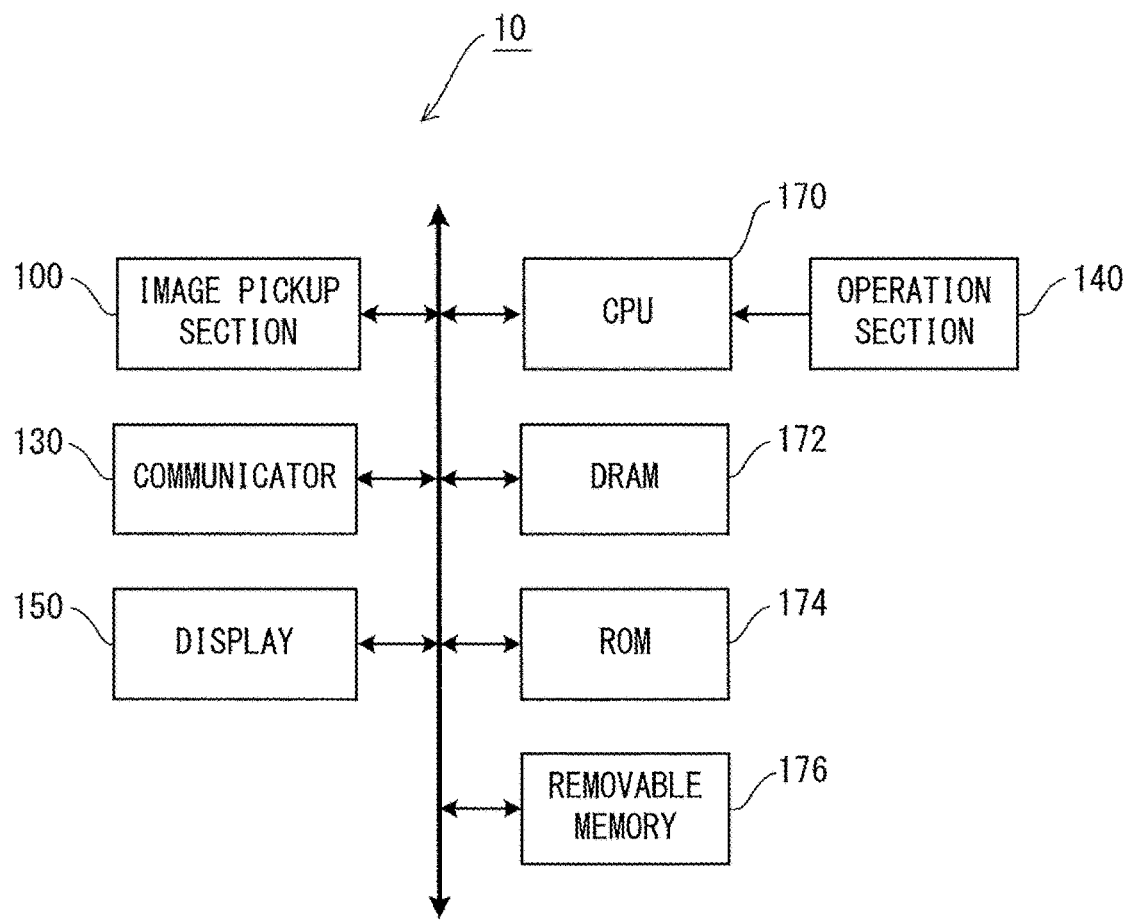
FIG. 4 is a hardware block diagram of an imaging apparatus.

FIG. 4 is a hardware block diagram of the imaging apparatus 10. The imaging apparatus 10 includes a central processing unit (CPU) 170, a dynamic random access memory (DRAM) 172, a read only memory (ROM) 174, a removable memory 176, the image pickup section 100, the communicator 130, the operation section 140, and the display 150.

The CPU 170 reads and executes a control program stored in the ROM 174, and controls the imaging apparatus 10 by software processing. The DRAM 172 provides a working area used to temporally store the control program or various data. The ROM 174 is, for example, a flash memory, and nonvolatilely stores therein the control program. Further, the ROM 174 stores therein various data, construction-related information 510, a captured image 520, and a captured image 530 with a display board, and constitutes the memory 120. The controller 110 is implemented by the CPU 170, the DRAM 172, and the ROM 174.

The removable memory 176 is, for example, a flash memory. A captured image 520, a captured image 530 with a display board, and construction-related information 510 may be stored in the removable memory 176. The image pickup section 100, the communicator 130, the operation section 140, and the display 150 have been described above, so their descriptions are omitted.

Figure 5:
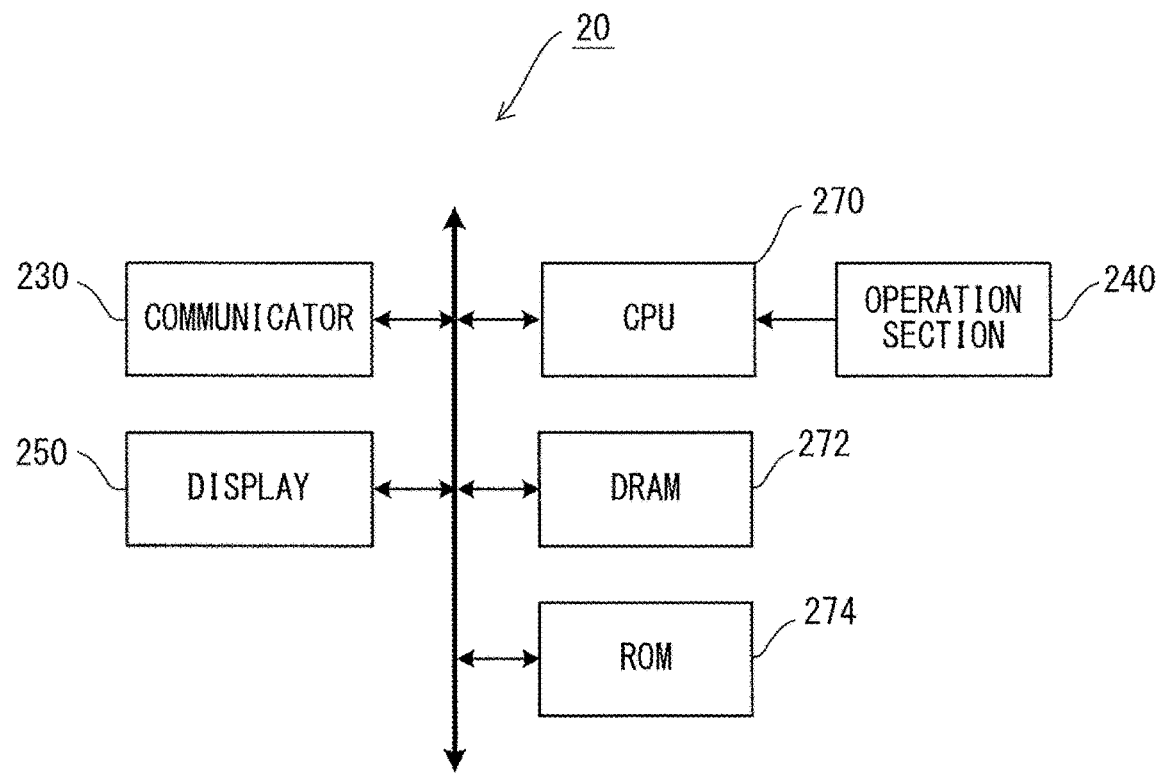
FIG. 5 is a hardware block diagram of an information processing apparatus.

FIG. 5 is a hardware block diagram of the information processing apparatus 20. The information processing apparatus 20 includes a central processing unit (CPU) 270, a dynamic random access memory (DRAM) 272, a read only memory (ROM) 274, the communicator 230, the operation section 240, and the display 250.

The CPU 270 reads and executes a control program stored in the ROM 274, and controls the information processing apparatus 20 by software processing. The DRAM 272 provides a working area used to temporally store the control program or various data. The ROM 274 nonvolatilely stores therein the control program or data. Further, the ROM 274 stores therein an original display-board image 502 and whole-construction information 512, and constitutes the memory 220. The controller 210 is implemented by the CPU 270, the DRAM 272, and the ROM 274. The communicator 230, the operation section 240, and the display 250 have been described above, so their descriptions are omitted.

Figure 6:
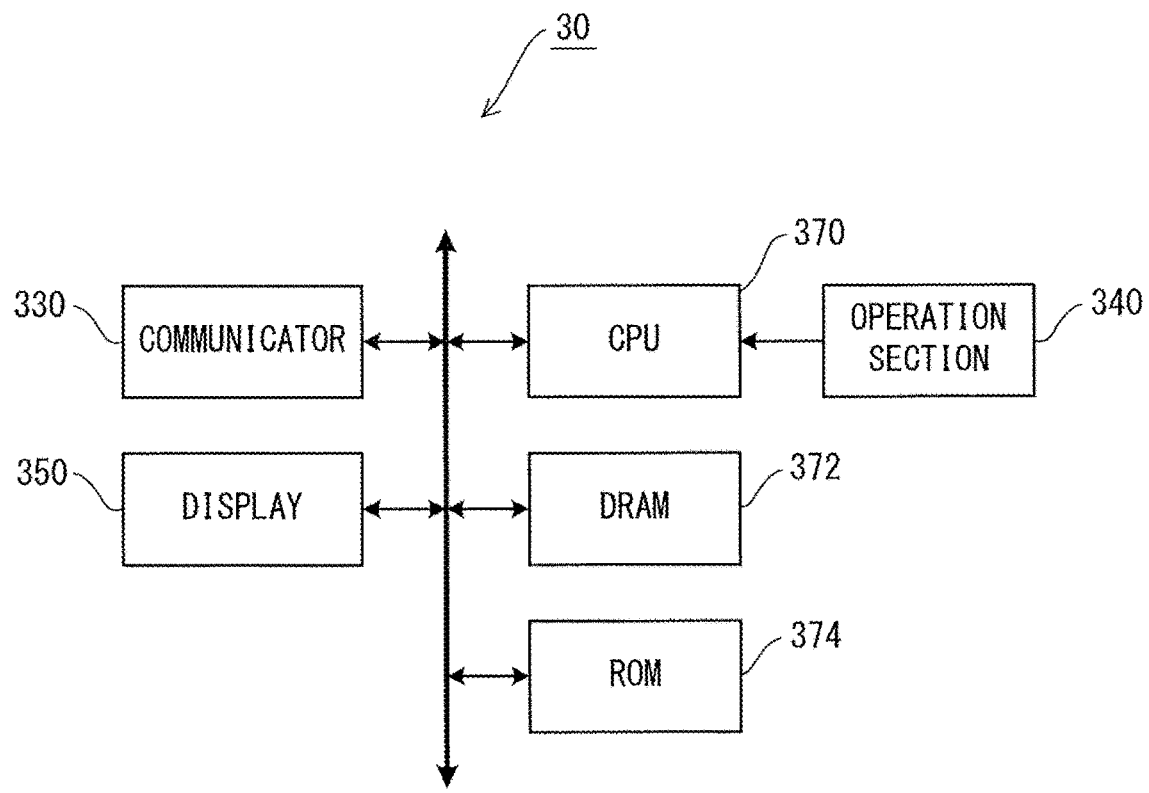
FIG. 6 is a hardware block diagram of an image management apparatus.

FIG. 6 is a hardware block diagram of the image management apparatus 30. The image management apparatus 30 includes a central processing unit (CPU) 370, a dynamic random access memory (DRAM) 372, a read only memory (ROM) 374, the communicator 330, the operation section 340, and the display 350.

The CPU 370 reads and executes a control program stored in the ROM 374, and controls the image management apparatus 30 by software processing. The DRAM 372 provides a working area used to temporally store the control program or various data. The ROM 374 nonvolatilely stores therein the control program. Further, the ROM 374 stores therein an original display-board image 502 and construction-related information 510, and constitutes the memory 320. The controller 310 is implemented by the CPU 370, the DRAM 372, and the ROM 374. The communicator 330, the operation section 340, and the display 350 have been described above, so their descriptions are omitted.

FIG. 7 is a flowchart that illustrates a procedure of processing of generating and transmitting, for example, a display-board image that is performed by the information processing apparatus 20. When an instruction to generate a display-board image has been given to the controller 210 by an operator through the operation section 240, the controller 210 starts generating a display-board image (Step S10).

The operator refers to, for example, a photographing plan (not illustrated) displayed on the display 250 and specifies a photographing target for which a display-board image is to be generated. The controller 210 inputs the specified photographing target as generation information (Step S12).

The construction-related-information generator 214 reads information about the specified photographing target from whole-construction information 512 stored in the memory 220 (Step S14). The construction-related-information generator 214 generates construction-related information 510 according to the information about the photographing target that has been read from the whole-construction information 512 (Step S16).

The display-board-image generator 212 extracts display details 500b from the construction-related information 510. Then, the display-board-image generator 212 adds the extracted display details 500b to an original display-board image 502, so as to generate a display-board image 500 (Step S18). As described above, the display-board-image generator 212 may search the construction-related information 510 for a design drawing of a construction portion and add the design drawing to the original display-board image 502.

The controller 210 stores the display-board image 500 and the construction-related information 510 in the memory 220 (Step S20). When a plurality of photographing targets have been specified by the operator, the controller 210 stores the display-board image 500 and the construction-related information 510 for each of the photographing targets in the memory 220. As described above, the controller 210 incorporates the construction-related information 510 into a file of the display-board image 500 and stores the file in the memory 220.

The controller 210 determines whether an instruction to transmit a display-board image has been received from the imaging apparatus 10 (Step S22). The controller 210 loops the process of Step S22 until the instruction to transmit a display-board image is received from the imaging apparatus 10 (NO in Step S22).

When the controller 210 has determined that the instruction to transmit a display-board image has been received from the imaging apparatus 10 (YES in Step S22), the controller 210 transmits a file of the display-board image 500 according to the instruction to the imaging apparatus 10 (Step S24). As described above, the construction-related information 510 is transmitted by being incorporated into the file of the display-board image 500.

Figure 8A:
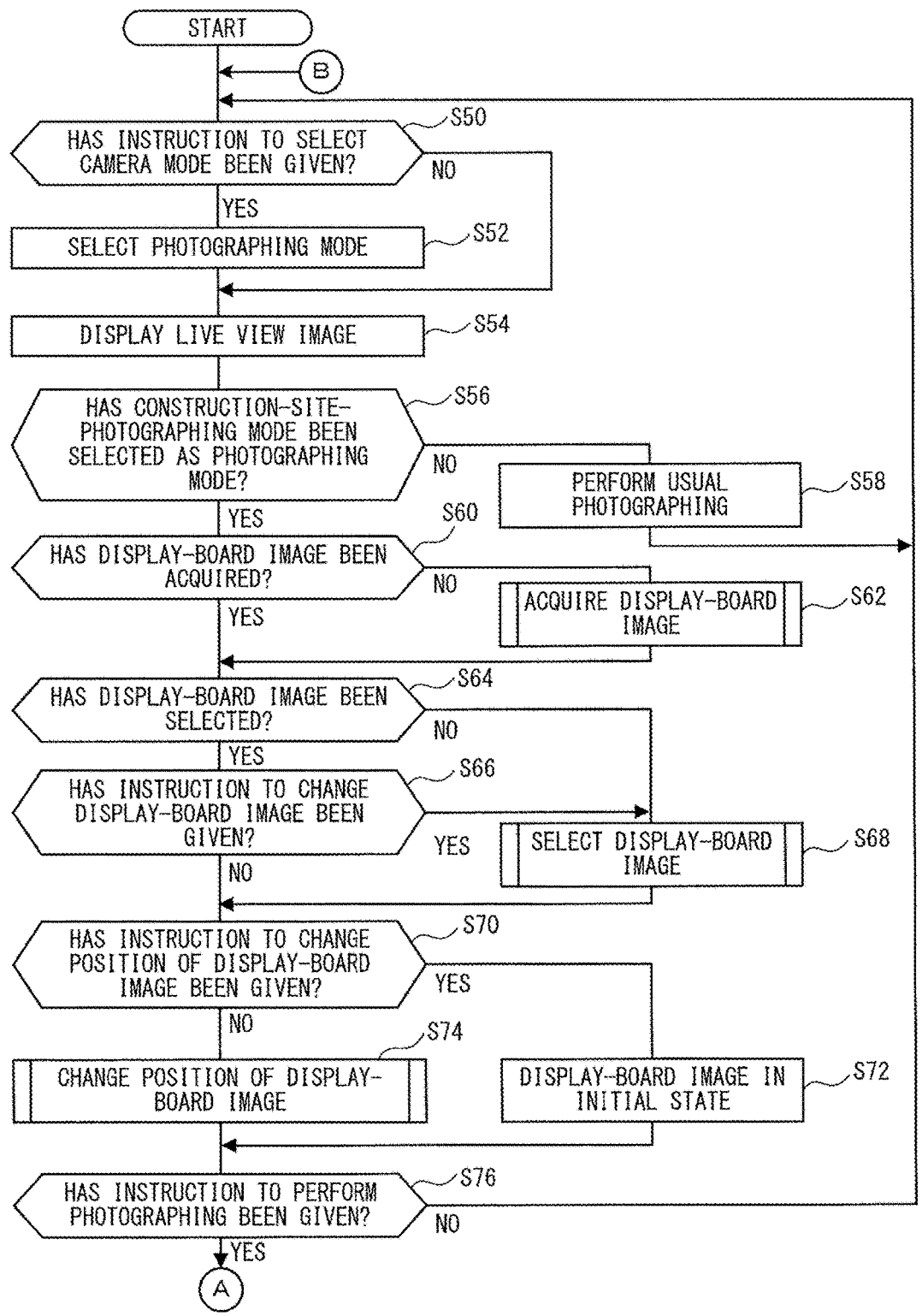
FIG. 8A is part 1 of a flowchart that illustrates a procedure of image-capturing processing performed by the imaging apparatus.
Figure 8B:
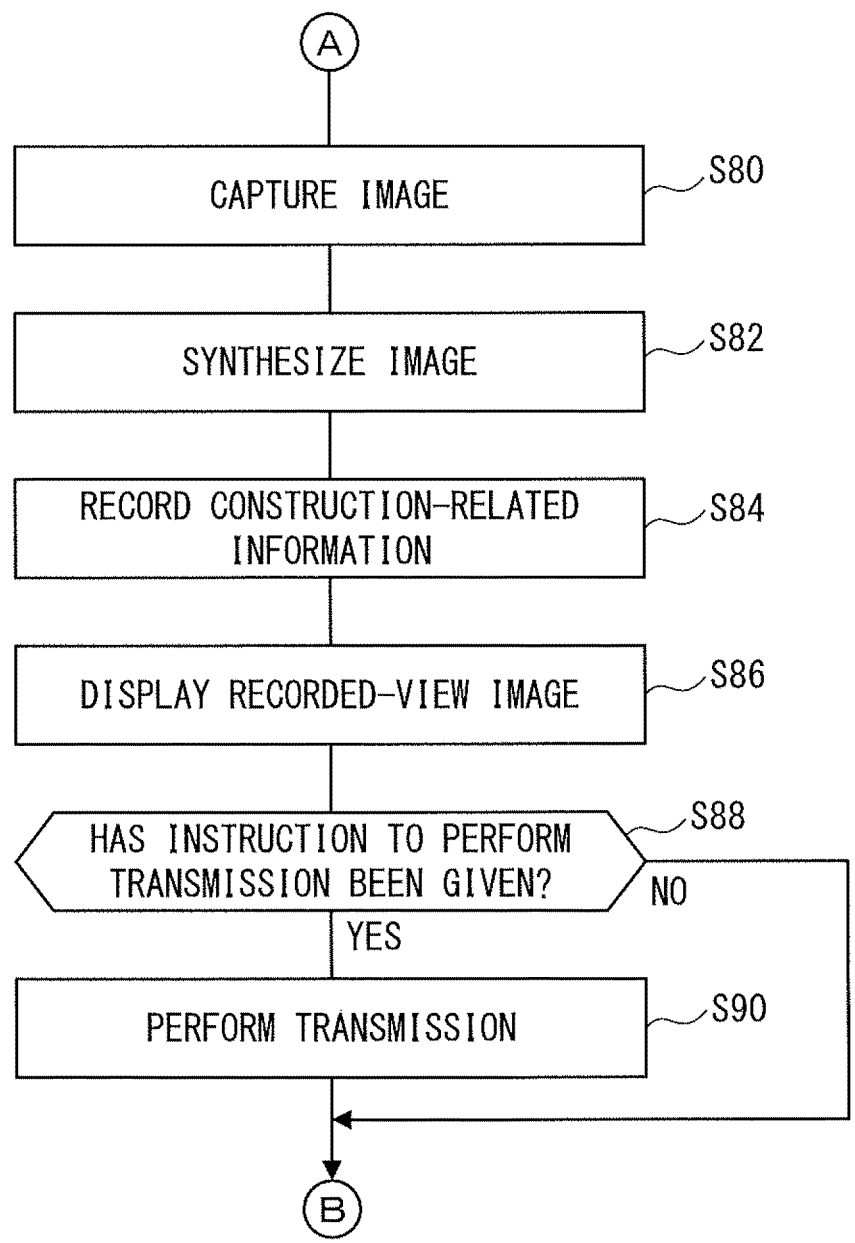
FIG. 8B is part 2 of the flowchart that illustrates the procedure of the image-capturing processing performed by the imaging apparatus.

FIGS. 8A and 8B are part 1 and part 2 of a flowchart that illustrates a procedure of construction-related-image capturing processing performed by the imaging apparatus 10. The controller 110 determines whether a photographer has given an instruction to select a camera mode (Step S50). The camera mode is a mode to perform photographing.

When the controller 110 has determined that the instruction to select the camera mode has not been given (NO in Step S50), the process moves on to Step S54. When the controller 110 has determined that the instruction to select the camera mode has been given (YES in Step S50), the controller 110 displays a photographing-mode selection screen.

FIG. 12 illustrates screens D1 to D3 displayed on the display 150 of the imaging apparatus 10. The screen D1 in FIG. 12 is an example of the photographing-mode selection screen. When the instruction to select the camera mode has been given by the photographer, the screen D1 is displayed. The controller 110 selects a photographing mode according to the instruction given by the photographer (Step S52). A usual-photographing mode and a construction-site-photographing mode are provided as the photographing mode.

After the controller 110 selects the photographing mode, the controller 110 displays a live view image (Step S54). The controller 110 determines whether the selected photographing mode is a construction-site-photographing mode (Step S56). The construction-site-photographing mode is a photographing mode for performing photographing at a construction site. When the controller 110 has determined that the photographing mode is not the construction-site-photographing mode (NO in Step S56), the controller 110 performs usual photographing (Step S58). The description of the usual photographing is omitted.

When the controller 110 has determined that the photographing mode is the construction-site-photographing mode (YES in Step S56), the controller 110 determines whether a display-board image has been acquired (Step S60). When the controller 110 has determined that the display-board image has not been acquired (NO in Step S60), the controller 110 acquires the display-board image (Step S62).

Figure 9:
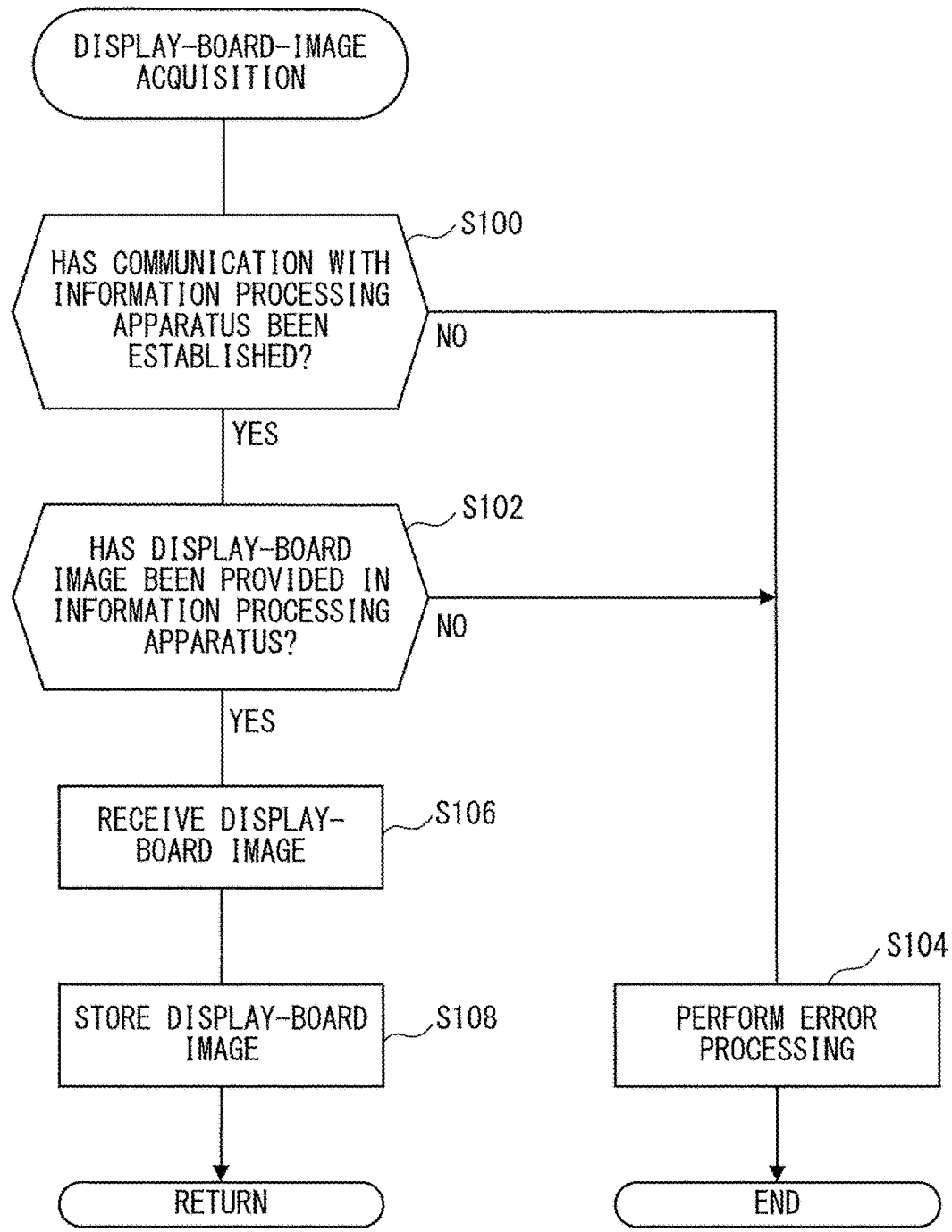
FIG. 9 is a subroutine for explaining a procedure of display-board-image acquisition processing.

FIG. 9 is a subroutine for explaining a procedure of display-board-image acquisition processing. The controller 110 tries to communicate with the information processing apparatus 20 and determines whether a communication with the information processing apparatus 20 has been established (Step S100). When the controller 110 has determined that a communication with the information processing apparatus 20 has not been established (NO in Step S100), the controller 110 performs error processing such as presenting an error display on the display 150 (Step S104), and terminates the construction-site-photographing mode.

When the controller 110 has determined that a communication with the information processing apparatus 20 has been established (YES in Step S100), the controller 110 determines whether a display-board image has been provided in the information processing apparatus 20 (Step S102). The controller 110 inquires of the information processing apparatus 20 whether a display-board image has been provided. When the controller 110 has been informed by the information processing apparatus 20 that the display-board image has not been provided (NO in Step S102), the controller 110 performs error processing such as presenting an error display on the display 150 (Step S104), and terminates the construction-site-photographing mode.

When the controller 110 has been informed by the information processing apparatus 20 that the display-board image has been provided (YES in Step S102), the controller 110 asks the information processing apparatus 20 to transmit the display-board image to the controller 110. Using the communicator 130, the controller 110 receives a display-board image 500 including construction-related information 510 that is transmitted from the communicator 230 of the information processing apparatus 20 (Step S106).

The file controller 114 separates the construction-related information 510 from the received display-board image 500, and stores the display-board image 500 and the construction-related information 510 in the memory 120 (Step S108). The process returns to FIG. 8A.

The screen D2 in FIG. 12 is an example of a live view screen displayed on the display 150 in the construction-site-photographing mode. A mark ("LIVE") indicating that it is in the construction-site photographing mode is displayed in the upper left part of the live view screen. A display-board shape 504 indicating a shape of a display-board image may be displayed on the live view screen in an overlapping manner such that it is easy to determine a composition for photographing.

When the controller 110 has determined that a display-board image has been acquired (YES in Step S60), the controller 110 determines whether a display-board image used for photographing has been selected (Step S64). When the controller 110 has determined that the display-board image used for photographing has not been selected (NO in Step S64), the controller 110 displays a screen for selecting a display-board image (Step S68) so as to cause the photographer to select the display-board image used for photographing.

Figure 10:
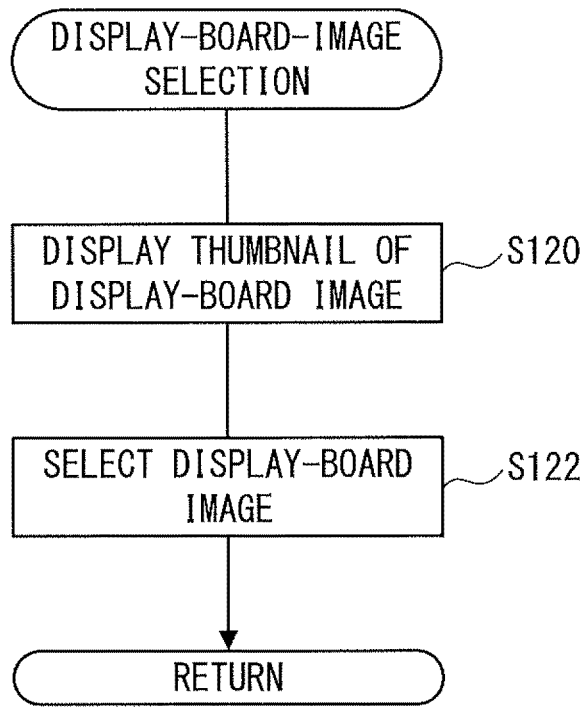
FIG. 10 is a subroutine for explaining a procedure of display-board-image selection processing.

FIG. 10 is a subroutine for explaining a procedure of display-board-image selection processing. The controller 110 displays, on the display 150, a thumbnail of a display-board image 500 stored in the memory 120 (Step S120). The screen D3 in FIG. 12 is an example of a thumbnail display of the display-board image 500. Thumbnails of nine display-board images 500 that respectively correspond to a construction number 1 to a construction number 9 are displayed on the screen D3.

The photographer specifies a display-board image 500 that corresponds to a current photographing target (a current construction site) from among the displayed thumbnails of the display-board images 500. For example, when a construction site 4 is a photographing target, the photographer specifies a thumbnail of the construction site 4. The controller 110 selects, as a display-board image 500 to be synthesized into a captured image, the display-board image 500 specified by the photographer from among the displayed thumbnails (Step S122). The process returns to FIG. 8A.

When the controller 110 has determined that a display-board image used for photographing has been selected (YES in Step S64), the controller 110 determines whether the photographer has given an instruction to change the display-board image used for photographing (Step S66). This is a case in which the photographer changes a photographing target. When the controller 110 has determined that the photographer has given the instruction to change the display-board image (YES in Step S66), the process moves on to Step S68 described above, and the controller 110 displays a thumbnail screen of a display-board image 500 and causes a new display-board image 500 to be selected.

When the controller 110 has determined that the instruction to change the display-board image has not been given (NO in Step S66), the controller 110 determines whether the photographer has given an instruction to change the position or the size of the display-board image (Step S70). The photographer can give an instruction to perform such a change, for example, using a display-board changing button (not illustrated) displayed on a screen. When the controller 110 has determined that the instruction to change the position or the size of the display-board image has not been given (NO in Step S70), the display-board-image generator 212 remains the position and the size of the display-board image in an initial state (default) (Step S72).

When the controller 110 has determined that the instruction to change the position or the size of a display-board image has been given (YES in Step S70), the display-board-image generator 212 changes the position or the size of a display-board image according to the instruction (Step S74).

Figure 11:
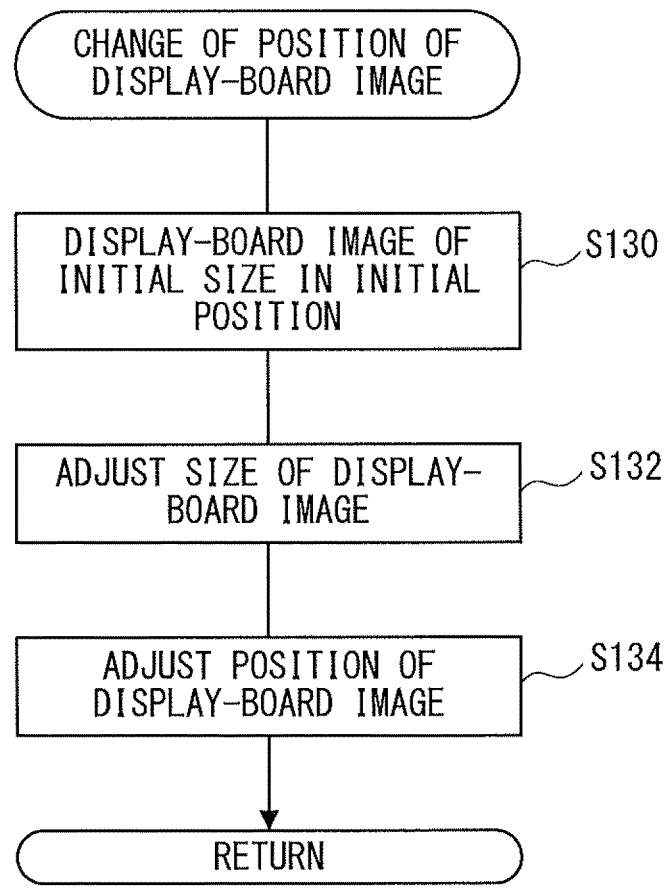
FIG. 11 is a subroutine for explaining a procedure of processing of changing a position of a display-board image.

FIG. 11 is a subroutine for explaining a procedure of processing of changing a position of a display-board image. First, the display-board-image generator 212 displays a display-board image 500 of an initial size in an initial position overlapping a captured image 520 (Step S130).

FIG. 13 illustrates screens for explaining a manipulation of processing of changing a position of a display-board image. A screen D4 in FIG. 13 is a live view screen that a display-board image of an initial size in an initial position overlaps. Further, instead of a display-board image 500, a display-board shape 504 is displayed on the screen D4. Of course a display-board image 500 may be displayed.

The display-board-image generator 212 adjusts the size of the display-board shape 504 according to an instruction given by the photographer (Step S132). On a screen D5 in FIG. 13, how the size of a display-board is adjusted is indicated. For example, the size of the display-board shape 504 is increased by manipulating an upper button of a button 140a, and is reduced by manipulating a lower button of the button 140a.

The display-board-image generator 212 adjusts a position of a display board according to an instruction given by the photographer (Step S134). On a screen D6 in FIG. 13, how the position of a display-board image 500 is adjusted is indicated. For example, when the button 140a is manipulated obliquely (when the upper button and a right button are manipulated at the same time), the position of the display-board shape 504 is moved in the same direction as the direction of the oblique manipulation. When the processing of changing a position of a display-board image is terminated, the process returns to FIG. 8A.

The controller 110 determines whether the photographer has given an instruction to perform photographing (Step S76). When the controller 110 has determined that the photographer has not given the instruction to perform photographing (NO in Step S76), the process returns to Step S50.

When the controller 110 has determined that the photographer has given the instruction to perform photographing (YES in Step S76), the process moves on to FIG. 8B and the controller 110 captures an image (Step S80). The display-board-image generator 212 synthesizes the display-board image 500 into the captured image 520 (Step S82). The display-board-image generator 212 synthesizes, into the captured image 520, the display-board image 500 that has been selected in Step S68 and whose position or size has been set in Step S72 or S74, so as to generate a captured image 530 with a display board.

The file controller 114 incorporates construction-related information 510 corresponding to the captured image 530 with a display board into a file of the captured image 530 with a display board, and records the file in the memory 120 (Step S84). The controller 110 displays the captured image 530 with a display board on the display 150 as a recorded-view image (Step S86).

The controller 110 determines whether the photographer has given an instruction to transmit the captured image 530 with a display board to the image management apparatus 30 (Step S88). The photographer gives the instruction to transmit the captured image 530 with a display board to the image management apparatus 30 every time photographing is performed or after a series of photographing is completed.

When the controller 110 has determined that the photographer has not given the instruction to transmit the captured image 530 with a display board to the image management apparatus 30 (NO in Step S88), the process returns to Step S50. When the controller 110 has determined that the photographer has given the instruction to transmit the captured image 530 with a display board to the image management apparatus 30 (YES in Step S88), the controller 110 transmits, to the image management apparatus 30, the captured image 530 with a display board into which the construction-related information 510 has been incorporated (Step S90). After the controller 110 performs the transmission, the process returns to Step S50.

<Modification>

A modification is described below. The example of incorporating construction-related information 510 into a file of a display-board image 500 and transmitting the file from the information processing apparatus 20 to the imaging apparatus 10 has been described above, but the method for integrally transmitting and managing a display-board image 500 and construction-related information 510 is not limited to this. Likewise, the example of incorporating construction-related information 510 into a file of a captured image 530 with a display board and transmitting the file from the imaging apparatus 10 to the image management apparatus 30 has been described above, but the method for integrally transmitting and managing a captured image 530 with a display board and construction-related information 510 is not limited to this. Another example of integrally managing two pieces of data is described below.

Figure 14:
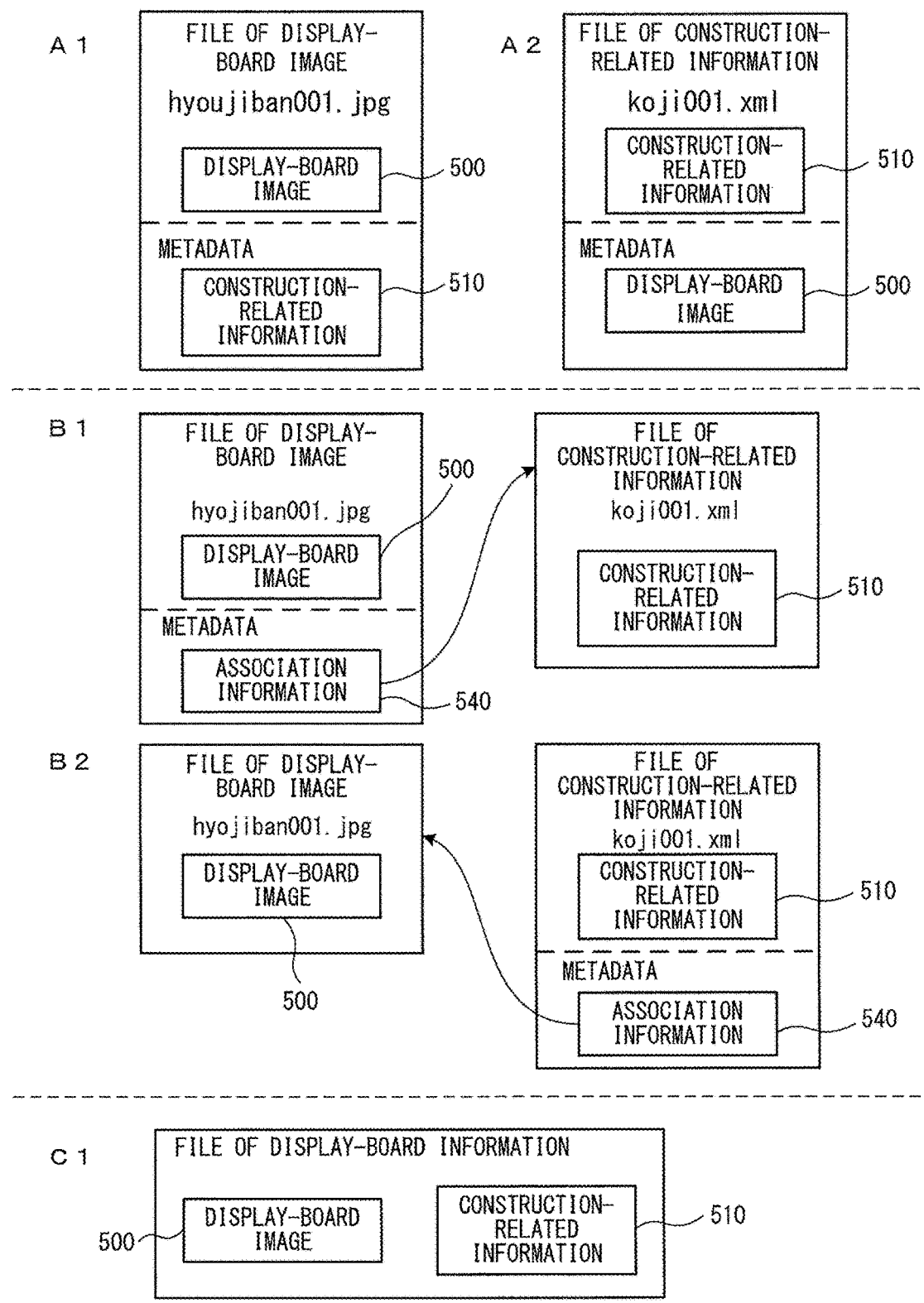
FIG. 14 illustrates examples of combination patterns of a display-board image and construction-related information.

FIG. 14 illustrates examples of combinations of a display-board image 500 and construction-related information 510. A pattern A1 is an example of the configuration described above in which construction-related information 510 is incorporated into a display-board image 500. The construction-related information 510 is incorporated into a file of the display-board image (for example, file name: hyojiban001.jpg) as metadata. Conversely, the construction-related information 510 may be incorporated into the display-board image 500 as in the case of a pattern A2. In the pattern A2, the display-board image 500 is incorporated as metadata of a file of the construction-related information (for example, file name: koji001.xml). The file of construction-related information is, for example, an xml file.

A pattern B1 and a pattern B2 are examples in which files of a display-board image 500 and construction-related information 510 are different. In this case, association information 540 is provided so that the two files can be integrally treated. The pattern B1 is an example in which the association information 540 is provided as metadata of a file of the display-board image 500. The association information 540 is information that associates a file of a display-board image with a file of corresponding construction-related information.

A pattern B2 is an example in which the association information 540 is provided as metadata of a file of the construction-related information 510.

A pattern C1 is an example in which a display-board image 500 and construction-related information 510 are incorporated into one file (a file of display-board information). In the example of the pattern C1, association information 540 is not necessary.

Figure 15:
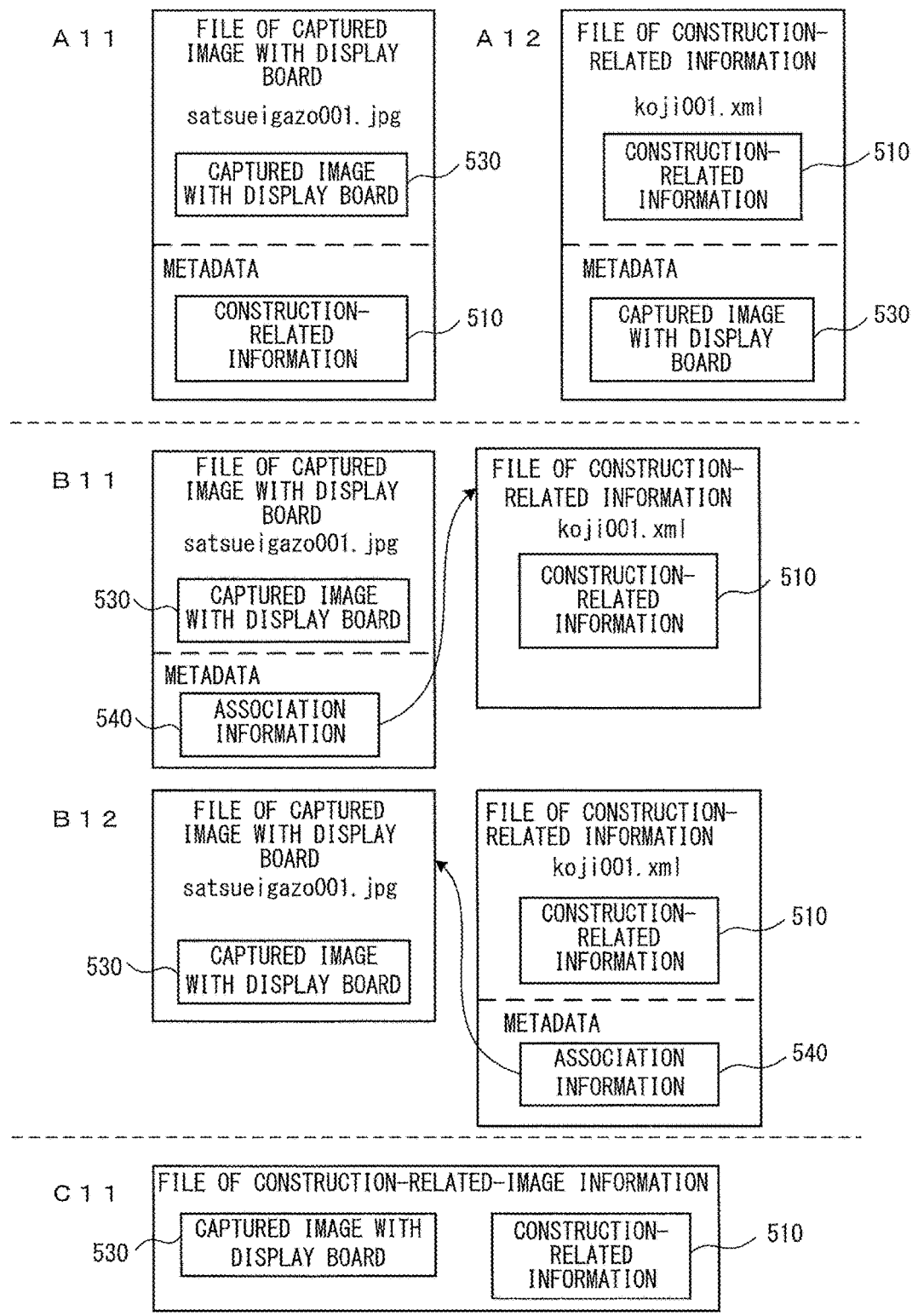
FIG. 15 illustrates examples of combination patterns of a captured image with a display board and construction-related information.

FIG. 15 illustrates examples of combinations of a captured image 530 with a display board and construction-related information 510. Patterns A11, A12, B11, B12, and C11 are examples that are similar to the patterns A1, A2, B1, B2, and C1, respectively.

The pattern A11 is an example of the configuration described above in which construction-related information 510 is incorporated into a captured image 530 with a display board. The construction-related information 510 is incorporated into a file of the captured image 530 with a display board (filename: satsueigazo001.jpg) as metadata. Conversely, the construction-related information 510 may be incorporated into the captured image 530 with a display board as in the case of the pattern A12. In the pattern A12, the captured image 530 with a display board is incorporated as metadata of a file of the construction-related information (file name: koji001.xml).

The pattern B11 and the pattern B12 are examples in which a file of a captured image 530 with a display board and a file of construction-related information 510 are different. The pattern B11 is an example in which association information 540 that associates, with construction-related information 510, a captured image 530 with a display board is provided as metadata of a file of the captured image 530 with a display board. The pattern B12 is an example in which the association information 540 is provided as metadata of a file of the construction-related information 510.

The pattern C11 is an example in which a captured image 530 with a display board and construction-related information 510 are incorporated into one file (a file of construction-related-image information).

Effects provided by the present embodiment are described below.

The present embodiment provides an image-capturing system that acquires, without any complicated processing being performed by a camera, a captured-image with a display board that is highly reliable as an evidence. It is possible to synthesize a display-board image into a captured image by inputting, to a camera, construction-related information that is to be written on a display board at a construction site. However, this will impose a great burden on a worker at a construction site. According to the present embodiment, a great burden is not imposed on a worker at a construction site. Further, it is also possible to synthesize a display-board image into a captured image using a PC (a personal computer) after photographing, not when photographing is performed. However, if an image synthesis is performed after photographing, a time lag will occur between a synthesis of a virtual display board into an image and a creation of an information area, and there may be a difference from a construction-site image, which results in acquiring a captured image with a lower reliability as an evidence. According to the present embodiment, it is also possible to avoid decreasing reliability of a captured image used as an evidence.

Further, there is no need to create and display a display board at a construction site, so it is possible to reduce the number of man-hours and manpower that are needed to create and display the display board. Furthermore, there may be a mistake in writing information on a display board because a construction site is busy. In the present embodiment, a display board on which information has been written in advance is used, so a mistake in writing information on the display board can be prevented with certainty.

Information that can be written on a display board is limited, so when it is necessary to know a concrete construction target portion or details of the construction target portion such as its material and its size, there is a need to search, for example, a design drawing, specifications, or a time schedule of the whole construction for the construction target portion and to check the details of it. According to the present embodiment, a captured image 530 with a display board and construction-related information 510 about the construction target portion (a photographing target portion) are combined and stored in the image management apparatus 30. This results in being able to easily access corresponding construction-related information using a construction-related image. The image management apparatus 30 can not only manage an evidence image of each construction target but also manage the construction target from the aspects of both an appearance image and construction-related information.

Construction-related information 510 and a captured image 530 with a display board are combined and transmitted from the imaging apparatus 10 to the image management apparatus 30. Thus, it is not necessary for the image management apparatus 30 to acquire construction-related information 510 separately from a captured image 530 and to combine the construction-related information 510 with the captured image 530 with an image board.

The example in which the controller 110 is provided by the CPU 170 performing software processing and the controller 210 is provided by the CPU 270 performing software processing has been described, but the embodiments of the present invention are not limited to this configuration. For example, a portion of or the entirety of the controllers 110 and 210 may be configured by hardware such as a gate array.

Note that the present invention is not limited exactly to the above embodiments, and can be embodied in the implementation phases by modifying constitutional elements without departing from the spirit of the present invention. Also, it is possible to form various inventions by an appropriate combination of a plurality of constituent elements disclosed in the above embodiments. For example, all the constituent elements disclosed in the above embodiments may be combined appropriately. Further, constituent elements selected from different embodiments may be combined appropriately. It is as a matter of course that these various modification and application are possible without departing from the spirit of the present invention.

EXPLANATIONS OF LETTERS OR NUMERALS 1 image capturing system
10 imaging apparatus
20 information processing apparatus
30 image management apparatus
100 image pickup section
110, 210, 310 controller
112 image synthesizer
114 file controller
120, 220, 320 memory
130, 230, 330 communicator
140, 240, 340 operation section
150, 250, 350 display
212 display-board-image generator
214 construction-related-information generator
500 display-board image
502 original display-board image
510 construction-related information
512 whole-construction information
520 captured image
530 captured image with a display board
540 association information

What is claimed is:
1. An image capturing system comprising an imaging apparatus and an information processing apparatus, wherein
the information processing apparatus includes a display-board-image generator that generates a display-board image corresponding to a photographing target, a construction-related-information generator that generates construction-related information about the photographing target, and a communicator that transmits the display-board image and the construction-related information to the imaging apparatus;

the imaging apparatus includes an image pickup section that captures an image and outputs the captured image, a communicator that receives the display-board image and the construction-related information that are transmitted from the information processing apparatus, and an image synthesizer that synthesizes the display-board image corresponding to the photographing target into the captured image so as to generate a captured image with a display board; and the communicator of the imaging apparatus transmits the generated captured image with a display board and the construction-related information to the outside.

2. The image capturing system according to claim 1, wherein according to the construction-related information, the display-board-image generator adds information specifying the photographing target to an original display-board image to which the information specifying the photographing target has not been added, so as to generate the display-board image.

3. The image capturing system according to claim 2 comprising a memory that a plurality of sets of the display-board image and the construction-related information, wherein the image synthesizer synthesizes, into a captured image, the display-board image selected, according to the photographing target, from the display-board images stored in the memory of the imaging apparatus, so as to generate the captured image with a display board.

4. The image capturing system according to claim 1, wherein the construction-related-information generator generates the construction-related information from whole-construction information that is information about a whole construction.

5. The image capturing system according to claim 4, wherein the display-board-image generator extracts information specifying the photographing target from the construction-related information.

6. The image capturing system according to claim 1, wherein the communicator of the information processing apparatus incorporates the construction-related information into a file of the display-board image and transmits the file of the display-board image, or the communicator of the information processing apparatus incorporates the display-board image into a file of the construction-related information and transmits the file of the construction-related information.

7. The image capturing system according to claim 1, wherein the communicator of the information processing apparatus transmits, to the imaging apparatus, the display-board image and the construction-related information, as well as association information that associates a display-board image with corresponding construction-related information.

8. The image capturing system according to claim 7, wherein the communicator of the information processing apparatus incorporates the association information into one of a file of the display-board image and a file of the construction-related information.

9. The image capturing system according to claim 1, wherein the communicator of the information processing apparatus incorporates the display-board image and the construction-related information into one file and transmits the file.

10. The image capturing system according to claim 1 comprising an image management apparatus that receives and manages the captured image with a display board and the corresponding construction-related information that are transmitted from the imaging apparatus.

11. An imaging apparatus that communicates with an external information processing apparatus, the imaging apparatus comprising:

an image pickup section that captures an image and outputs the captured image;

a communicator that receives a display-board image corresponding to a photographing target and construction-related information about the photographing target, the display-board image and the construction-related information being transmitted from the information processing apparatus; and an image synthesizer that synthesizes a corresponding display-board image into a captured image of the photographing target, so as to generate a captured image with a display board, wherein the communicator associates the generated captured image with a display board and the construction-related information about the photographing target with each other, and transmits the generated captured image with a display board and the construction-related information to the outside.

12. An image capturing method performed in an image capturing system that includes an imaging apparatus and an information processing apparatus, the image capturing method comprising:

generating, by the information processing apparatus, an display-board image corresponding to a photographing target;

generating, by the information processing apparatus, construction-related information about the photographing target;

transmitting, by the information processing apparatus, the display-board image and the construction-related information to the imaging apparatus;

receiving, by the imaging apparatus, the display-board image and the construction-related information that are transmitted from the information processing apparatus;

synthesizing, by the imaging apparatus, the display-board image corresponding to the photographing target into a captured image, so as to generate a captured image with a display board; and transmitting, by the imaging apparatus, the generated captured image with a display board and the construction-related information to the outside.

* * * * *